May 4, 1965
R. A. KLEIST ETAL
3,182,314
DIRECTION SENSING FOR INTERROGATOR RESPONDER
SIGNALLING SYSTEMS
Filed June 4, 1962
2 Sheets-Sheet 1
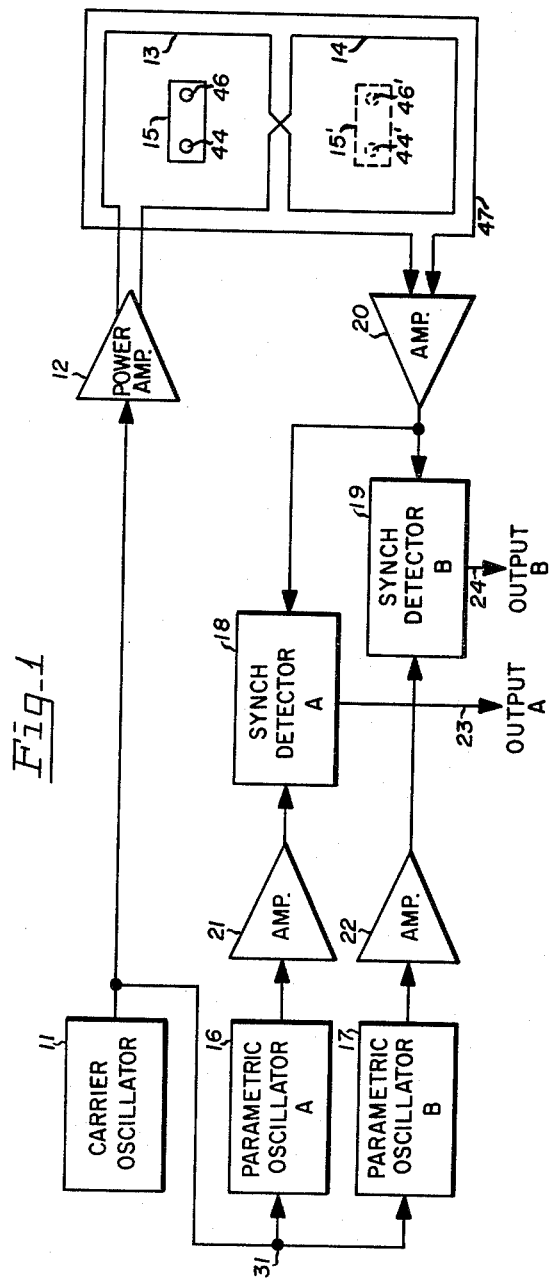
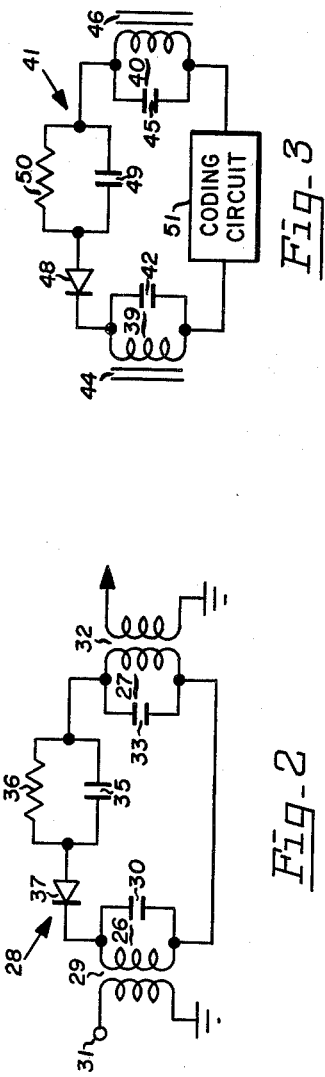
INVENTORS:
ROBERT A. KLEIST
HAROLD E. SWEENEY
BY
Edward A. Robinson
ATTORNEY INVENTORS
ROBERT A. KLEIST
HAROLD E. SWEENEY
BY
*Edward A. Robinson*
ATTORNEY

United States Patent Office 3,182,314
Patented May 4, 1965

3,182,314
DIRECTION SENSING FOR INTERROGATOR RESPONDER SIGNALLING SYSTEMS
Robert A. Kleist, Woodland Hills, and Harold E. Sweeney, Menlo Park, Calif., assignors to General Precision, Inc., Binghamton, N.Y., a corporation of Delaware
Filed June 4, 1962, Ser. No. 199,822
4 Claims. (Cl. 343—6.5)

This invention relates to interrogator responder signalling systems for identifying vehicles, employee badges and the like; and more particularly this invention relates to an improved system using parametric oscillator circuits which may provide direction-of-travel information in addition to identification information.

In a co-pending patent application, Serial No. 739,909 filed June 4, 1958, now U.S. Patent No. 3,054,100, by C. S. Jones entitled "Signalling System" an arrangement is disclosed for transmitting data between an interrogator device and one or more responder devices. This signalling system may be used for identifying vehicles which may move along a route or track past one or more interrogator stations at fixed locations. Each vehicle may carry a responder device which will pick up signals from each interrogator station and which will generate a response signal uniquely coded to identify the responder device and the vehicle carrying the device. A city bus carrying a responder device or response block may approach and pass over an interrogator location and will provide an identification signal which may be passed by a telephone circuit or other communication channel to a central location such as a dispatcher's office where it is desired to monitor movements of the city buses. Equipment of this type has been manufactured by the assignee of the instant patent application under the trademark "Tracer."

A co-pending patent application, Serial No. 154,459 entitled "Interrogator Responder Signalling System" filed on November 24, 1961, by Harold E. Sweeney, one of the co-inventors of the instant application discloses a system using parametric oscillators as response circuits. The parametric oscillator responder device disclosed by this co-pending application is passive, requiring no power source nor power cells; and since the circuit is relatively simple, it is adaptable for miniaturization for use in badges to be used by personnel.

In addition to identifying vehicles or badges which may pass various interrogator stations along a route or track, the direction of travel of the vehicle or other carrier may be of importance for adequate monitoring at a central dispatcher's office or other control location. A co-pending patent application, Serial No. 39,295 filed on June 28, 1960, now U.S. Patent No. 3,092,829, by Robert A. Kleist, one of the co-inventors of this application, entitled "Interrogator Responder Signalling System" and assigned to the same assignee as the instant application discloses an arrangement for sensing the direction of travel as well as the identification of city buses. This arrangement provides two separate receivers and receiver loops A and B spaced apart along a traffic lane at an interrogator station such that the direction of travel may be determined as "A before B" or "B before A."

It is an object of this invention to provide an improved interrogator responder signalling including parametric oscillator response circuits for generating response signals having a phase and frequency directly related to the phase and frequency of the interrogator signal, and providing a method and means for vehicle direction sensing by sensing the relative phase of the response signals.

It is a further object of this invention to provide an interrogator responder signalling system with an improved and simplified method and means for sensing direction of travel; and more specifically, it is an object to provide an interrogator loop arrangement which may cause a 90° shift in phase of a response signal as the responder device moves from one part of the loop to another part thereof, and including an arrangement for synchronously detecting the response signal to provide two output signals corresponding with the two possible phases of the response signal.

Numerous other objects and advantages will be apparent throughout the progress of the specification which follows. The accompanying drawings illustrate a certain exemplary embodiment of the invention and the views therein are as follows:

FIGURE 1 is a circuit diagram of the interrogator responder signalling system of this invention including a plan view of the interrogator loop arrangement;

FIGURE 2 is a diagram of a parametric oscillator circuit which is shown in block form in FIGURE 1;

FIGURE 3 is a circuit diagram of the parametric responder device used in this invention;

Figure 5:
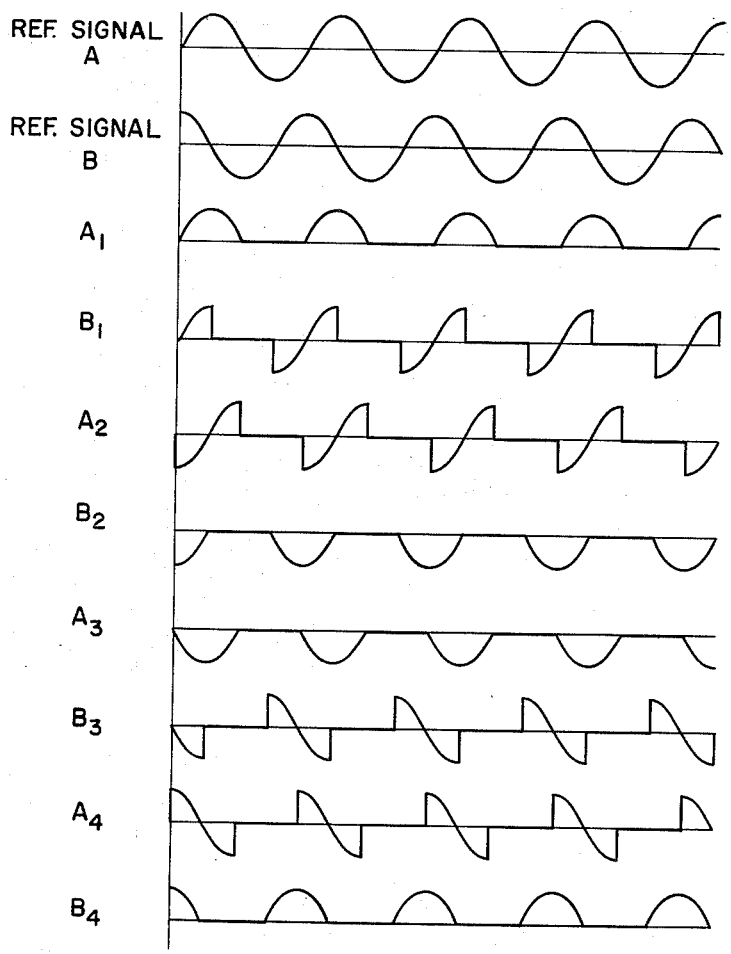
FIGURE 5 is a graphical representation of the wave forms for the various signals which will appear at points in the circuit of this invention.

Briefly stated, according to a preferred embodiment of this invention, the interrogator responder signalling system includes a carrier oscillator 11 for generating an interrogator signal. The interrogator signal is passed by a power amplifier circuit 12 to an inductive loop arrangement including two transmitter loops 13 and 14 coupled together in opposite phase relationship with respect to each other, and both coupled to receive the interrogator signal from the power amplifier 12. A responder device 15 is attached to and carried by a vehicle to be identified and may move along a traffic lane or track over the loops 13 and 14 and through magnetic fields established thereby. The responder device 15 will generate a response signal having a frequency of ½ of the carrier frequency of the interrogator signal. As the responder device or response block moves from the magnetic field of the first loop 13 to the field of the second loop 14 as shown at 15', the response signal will shift in phase by 90°. Two parametric oscillator circuits 16 and 17 are coupled to receive the carrier signal from the oscillator 11 and will provide two reference signals both having a frequency equal to ½ the carrier frequency, and being shifted in phase by 90° with respect to each other. Two synchronous detector circuits 18 and 19 are coupled via an amplifier 20 to receive the response signal and by respective amplifiers 21 and 22 to receive respective ones of the reference signals. The synchronous detector circuits 18 and 19 compare the response signal with respective reference signals and generate direct potential output signals at terminals 23 and 24 corresponding to the relative phase of the response signal.

FIGURE 2 shows a parametric oscillator circuit including two parallel tuned circuits 26 and 27 connected in series with a non-linear capacitance 28. A first tuned circuit 26 comprises a winding of a transformer 29 coupled in parallel with a capacitor 30. The primary winding of the transformer 29 is coupled to the carrier frequency oscillator 11 via an input terminal 31. The circuit 26 is tuned to the carrier frequency of the interrogator signal, and the windings of the transformer 29 may be loosely coupled whereby the resonant frequency of the circuit 26 will not be appreciably affected by circuitry to which the primary winding is connected. The tuned circuit 27 comprises a winding of a transformer 32 and a capacitor 33, and is tuned to a frequency equal to ½ the carrier frequency to which the circuit 26 is tuned. The transformer 32 will be loosely coupled between the primary and secondary windings thereof such that the circuitry coupled to an output terminal 34 will not appreciably affect the resonant frequency of the circuit 27.

The non-linear capacitance 28 includes a capacitor 35 coupled in parallel with a resistor 36 and a diode 37 coupled in series with both the capacitor and the resistor. The "Theory of Parametric Amplification Using Non-Linear Reactances" has been disclosed in an article of this title by S. Bloom and K. K. N. Chang in the RCA Review, December 1957 issue beginning on page 578. Another article by the same authors entitled "Parametric Amplifier Using Lower Frequency Pumping" appears in the Proceedings of the IRE, July 1958 issue beginning on page 1383. These articles disclose a parametric circuit having a non-linear inductive reactance coupled in parallel with three series resonant networks. The parametric oscillator circuits of FIGURE 2 and FIGURE 3 are the opposite or dual circuits having parallel resonant networks connected in series with a non-linear capacitive reactance. The theoretical and mathematical analysis set forth by the authors Bloom and Chang in the above articles is applicable to the dual circuits shown and described herein. Although the theory of parametric amplification and oscillation is set forth in the foregoing articles, the following brief description may be helpful in gaining an understanding of the instant invention.

During the first few cycles or the transient period when energy is first applied to the parametric oscillator of FIGURE 2, a direct current path will exist through the windings of the tuned circuits 26 and 27 and the diode 37. During this initial transient period, the carrier signal will be rectified, and the capacitor 35 will accumulate charge. The value of the capacitor 35 and the ohmic value of the resistor 36 are so chosen that the charge will not leak off from the capacitor during a single cycle of the carrier wave. After the first few cycles, the capacitor 35 retains its charge to back bias the diode 37. Therefore, during most of each cycle of the continuing carrier signal, the diode 37 remains cut off and exhibits properties of a non-linear capacitance, and the capacitive value thereof will vary in accordance with the applied voltage. In the circuit of FIGURE 2 the diode 37 together with the capacitor 35 and the resistor 36 constitute a non-linear capacitive reactance.

As disclosed in the articles of Bloom and Chang, supra, a non-linear reactance in a parametric circuit will affect both of the tuned circuits, and the tuned circuit 26 will pump energy into the tuned circuit 27. In a generalized parametric oscillator, the first tuned circuit 26, or pumping circuit, may pass energy into several response circuits such as the circuit 27. A requirement for parametric amplification or oscillation is that the sum of the resonant frequencies of each response circuit must equal the resonant frequency of the pumping circuit. The circuit shown in FIGURE 2 may be considered as a special case parametric oscillator having only one response circuit tuned to ½ the frequency of the pumping circuit; and in this case, the single response circuit 27 functions in a dual capacity as if there were two circuits coupled together both tuned to the same resonant frequency.

The circuit of the responder device of FIGURE 3 is similar to the parametric oscillator circuit of FIGURE 2, and includes two parallel tuned circuits 39 and 40 and a non-linear capacitive reactance 41. The tuned circuit 39 includes a capacitor 42 and an inductance winding having a ferrite core 44. Similarly, the second tuned circuit 40 includes a capacitor 45 and an inductance winding about a core 46. When the responder device 15 moves into the field of the inductive loop 13, a magnetic coupling will exist between the ferrite core 44 and the transmitter loop 13, and a similar magnetic coupling will exist between the other ferrite core 46 and a receiver loop 47. If the response block is moved to the position indicated by the dashed lines 15', a magnetic coupling will exist between the ferrite core 44' and the second transmitter loop 14 while the other magnetic coupling continues to exist between the ferrite core in position 46' and the receiver loop 47. In addition to the tuned circuits 39 and 40 the response oscillator includes a diode 48, a capacitor 49 and a resistor 50 functioning as a non-linear capacitance 41 similar to the non-linear capacitance 28 of the parametric circuit of FIGURE 2.

It will be appreciated that the parametric oscillator circuits 16 and 17 shown by FIGURE 2 and the response circuit of the device 15 shown by FIGURE 3 are substantially equivalent to each other. This becomes obvious when one considers that the magnetic coupling between the loop 13 (or 14) and the inductor 44 may be likened to the transformer 29, and similarly, the inductor 46 magnetically coupled with the receiver loop 47 may be likened to the transformer 32. For purposes of vehicle or badge identification, a coding circuit 51 may be included in the parametric oscillator of the responder device. This coding circuit 51 together with further circuitry of the interrogator station is disclosed and claimed in the co-pending patent application of this inventor, Serial No. 154,459, supra, and therefore, will not be discussed further in connection with this invention.

The parametric circuits of FIGURE 2 and FIGURE 3 may oscillate in either of two modes. The two oscillatory modes will produce similar output signals shifted in phase by 180° with respect to each other. Whether a circuit oscillates in one mode or the other, depends upon unpredictable spurious effects during the initial transient period when the oscillation is initiated. If a particular mode of oscillation were desired, it would be necessary to energize the parametric circuit with a pumping frequency and then to test the output signals. If the output signals were found to be opposite in phase from desired output signals, the terminal connections may be reversed, or alternatively, the circuit may be de-energized momentarily and then re-energized. It will be appreciated that each time that oscillation is commenced in the parametric circuit, the output signal will appear in one or the other of the two modes of oscillation in accordance with the law of probability. As will be discussed later in connection with the synchronous detector circuits 18 and 19, the particular mode of operation of the parametric circuits 16, 17 or the responder device 15 will be of no consequence, because the synchronous detector circuits will provide an output signal whenever the response signal is in phase with a reference signal, or is 180° out of phase therewith.

As indicated heretofore, the output signals from the parametric circuits 15, 16 and 17 will be of a frequency equal to ½ of the input carrier frequency, and the phase of the signals will be related to the phase of the carrier. When the carrier input signal is shifted in phase by 180°, the response signal or the reference signals from the circuits 15, 16 and 17 will be phase shifted by 90°. With respect to the responder device 15, it will be appreciated that the magnetic coupling between the input inductor 44 and the transmitter loops 13 and 14 will be reversed in phase when the responder device moves from the field of one loop to the field of the other. Therefore, the response signal generated by the responder device 15 will stop and then commence again with a 90° phase shift as the responder device moves from position 15 to position 15'. The parametric oscillator circuits 16 and 17 are both transformer coupled to the carrier oscillator 11, and therefore, the output reference signal from one of the oscillators 16 may be shifted by 90° from the reference signal of the other oscillator 17 by reversing the polarity of one or the other of the transformers 29. In practice, the parametric oscillator circuits may be inexpensively constructed such that the specific polarities are not predetermined. After assembly of the system, a responder device may be placed in the magnetic field of one transmitter loop or the other, and the input connections to the parametric oscillators 16 and 17 may be reversed, if necessary, to provide the desired output signals from the terminals 23 and 24.

Figure 4:
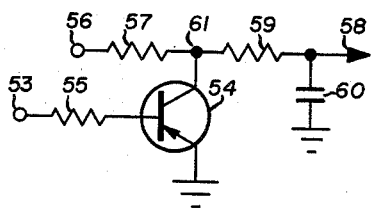
FIGURE 4 is a diagram of a synchronous detector circuit which is shown in block form in FIGURE 1.

In the synchronous detector circuit shown in FIGURE 4, a first input signal applied to an input terminal 53 is coupled to the base electrode of a transistor 54 by a resistor 55. The emitter electrode of the transistor 54 is directly connected to the ground reference potential. A second signal is applied to a second input terminal 56, and is coupled to the collector electrode of the transistor by a resistor 57. The collector electrode of the transistor 54 is coupled to an output terminal 58 by a resistor 59, and an integrating capacitor 60 is coupled between the output terminal 58 and the ground reference potential. With input signals of proper levels, it is of no consequence which of the signals is impressed upon one of the input terminals 53 and which signal is impressed upon the other. We may assume by way of example, that the reference signal is applied to the input terminal 53, and that the response signal is impressed upon the other input terminal 56. When so connected, the transistor 54 is rendered alternately conductive and non-conductive by the reference signal which is applied to the base electrode. When conductive, the transistor 54 grounds a point 61 and the response signal is by-passed to ground. When the transistor 54 is non-conductive, the response signal will be passed via the resistors 57 and 59 to the integrating capacitor 60. If the two signals impressed upon the input terminals 53 and 56 are of different frequencies, different portions of the waves of the response signal will be applied to the integrating capacitor 60 and no net charge will accumulate in the capacitor. If the signals impressed upon the terminals 53 and 56 are equal in frequency and are related in phase with each other, a chopping function of the transistor 54 will result in identical half waves of the response signal being continually applied to the capacitor 60. If the phase relationship between the two input signals is such that successive positive lobes, or successive negative lobes of the response signal are passed by the transistor 54, the circuit will function as a half wave rectifier whereby a capacitor 60 will accumulate a positive or negative charge corresponding to the polarity of the lobes which are passed. On the other hand, if the response signal bears a quadrature phase relationship with the reference signal, each successive non-conductive interval of the transistor 54 will pass portions of the response wave having equal positive and negative lobes whereupon no charge will accumulate in capacitor 60.

FIGURE 5 illustrates the wave forms and phase relationships that may exist in the two synchronous detector circuits 18 and 19 which receive a response signal and reference signals in quadrature phase relation with respect to each other. The first two curves of FIGURE 5 are representative of reference signals A and B which bias the base electrodes of the transistors. Each transistor 54 will be cut off during those times when the reference signal is positive in instantaneous value, and conversely, the transistor 54 will be biased into conduction and into saturation during those times when the reference signal is negative in instantaneous value. The curve $A_1$ indicates the voltage which will exist at the point 61 when the reference signal and the response signal are both applied to the synchronous detector in phase with each other. The first portion of the wave $A_1$ is positive in value since the transistor 54 is non-conductive during the initial half wave. The next half wave of the response signal would be negative in value, but is by-passed to ground by conduction of the transistor 54. The wave form at the point 61 of the transistor will appear as shown by figure $A_2$, providing half wave rectification of the response signal.

During this time the other synchronous detector 19 will receive the second reference signal (second line of FIGURE 5) which is phase shifted by 90° with respect to the reference signal A. The second terminal of the synchronous detector 19 receives the same response signal, but since the conductive intervals of the transistor are shifted in quadrature with the response signal, the wave which appears at the point 61 of circuit 19 will be as shown in figure $B_1$. It may be noted that the wave of the curve $B_1$ contains positive and negative lobes substantially equal in area, and therefore, no net charge or voltage level will appear at the output terminal 24.

If we assume that the responder device 15 moves from one transmitter loop 13 to the other transmitter loop 14, the response signal will shift 90° in phase. In this instance, the curves $A_2$ and $B_2$ may be derived from the respective synchronous detector circuits 18 and 19. In this case, the conductive intervals of the transistor of the synchronous detector 18 provides the wave form $A_2$ having equal positive and negative excursions, and therefore, no output voltage level will appear at the terminal 23. However, during this interval, the reference value from the parametric oscillator 17 may be in phase with the response signal such that the synchronous detector circuit 19 will act as a half wave rectifier to pass the negative half cycles of the response signal as shown in the curve $B_2$. In this case, a negative voltage will accumulate across the integrating capacitor 60 of the detector circuit 19 to provide a negative output potential.

The curves $A_3$ and $B_3$ and $A_4$ and $B_4$ represent further possible conditions or phase relationships between the response signal and representative ones of the reference signals. In each case, it may be noted that the net charge which may accumulate on the integrating capacitor 60 of a particular synchronous detector circuit will be zero while a voltage of either positive or negative polarity will accumulate on the integrating capacitor 60 of the other synchronous detector circuit. In summary, it may be appreciated that the synchronous detector circuits compare the response signals with respective ones of the reference signals to generate output voltages when the two signals are either in phase or 180° out of phase. On the other hand, when the two compared signals are substantially in quadrature with each other, no output voltage will appear at the output terminal of the synchronous detector circuit.

As indicated heretofore, both the response signal and the reference signals may be in either of two modes of oscillation which are shifted in phase by 180° from each other. The synchronous detector circuit heretofore described will generate an appropriate output voltage regardless of the mode of oscillation of any of the parametric oscillators 15, 16 or 17. The output voltages appearing at the terminals 23 and 24 may therefore be either positive or negative in polarity, and therefore, the polarity of the output voltage is not significant. It is contemplated that the synchronous detector circuits 18 and 19 will pass the generated output voltages to further circuitry which will be responsive merely to the presence or absence of such a voltage, and which will not be influenced by the polarity thereof. One such circuit device is a direct current relay which will provide switching action in response to a direct voltage, and will not discriminate as to the polarity of the voltage. The copending patent application, Serial No. 154,459, supra, discloses a means for passing low frequency tones from the synchronous detector output terminals in addition to direct potential levels. The tones convey identification information and may be separated from the direct potential levels by means such as coupling capacitors.

The direction of travel of a vehicle or other carrier of a responder device 15 is determined by the sequence of voltages which may appear at the terminals 23 and 24. If the responder device moves along a traffic lane such that it first appears in position 15 (FIGURE 1) and thence appears in position 15′, a voltage level may first appear at the output terminal 23, and thence a voltage level may appear at the output terminal 24. Thus, the direction of travel is established as A before B. Obviously, a reversed direction of travel of the responder device would provide a reversed sequence of output voltages. This invention therefore provides a simplification of vehicle direction sensing using only a single receiver and receiver loop 47 at each interrogator station.

The transmitter loop arrangement 13–14 shown by FIGURE 1 is a figure 8 having two lobes reversed in polarity. This loop arrangement may be considered as a single loop, or alternatively it may be considered as two separate loops. The transmitter loop arrangement has heretofore been described as two loops reversed in phase or polarity with respect to each other. Both loops receive the interrogator signal from the power amplifier 12, and it is of little consequence whether the figure 8 arrangements are used or whether two separate and independent loops are both coupled to receive the interrogator signal with means provided for reversing the polarity of one of the loops.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. An interrogator responder signalling system comprising an interrogator station and a responder device movable into spaced relation with the interrogator station, said interrogator station including a first inductive loop for transmitting an interrogator signal, said transmitter loop being operable to generate two magnetic fields of opposite polarity, said responder device including a parametric oscillator circuit for receiving energy from the interrogator signal and for generating a response signal, said interrogator station including a receiver including a receiver loop positioned in spaced relation with both magnetic fields of the transmitter loop, said receiver including means coupled to receive the interrogator signal and operable to generate a plurality of reference signals shifted in phase with respect to each other, said receiver further including synchronous detector means for comparing the response signal with the reference signals and for generating an output signal in accordance with the relative phase relationship between the response signal and the two reference signals.

2. An interrogator responder signalling system comprising an interrogator station and a responder device movable into spaced relation with the interrogator station, said interrogator station including a pair of inductive loops for transmitting an interrogator signal in two magnetic fields of opposite polarity, said responder device including a parametric oscillator circuit for receiving energy from the interrogator signal and for generating a response signal having a phase and frequency relationship to the interrogator signal, said interrogator station including a receiver including a receiver loop positioned in spaced relation with both magnetic fields of the transmitter loops, said receiver including parametric oscillator means coupled to receive the interrogator signal and operable to generate two reference signals which are shifted in phase with respect to each other and which are related in phase and frequency to the interrogator signal, said receiver further including synchronous detector means for comparing the response signal with the reference signals and for generating an output signal in accordance with the relative phase relationship between the response signal and the two reference signals.

3. An interrogator responder signalling system comprising an interrogator station and a responder device movable into spaced relation with the interrogator station, said interrogator station including a pair of inductive loops for transmitting an interrogator signal having a predetermined carrier frequency, said inductive loops being reversed in polarity with respect to each other to generate magnetic fields of opposite polarity, said responder device including a parametric oscillator circuit for receiving the interrogator signal and for generating a response signal having a frequency equal to ½ of the carrier frequency, the interrogator station including a receiver having a receiver loop positioned in spaced relation with both of the transmitter loops, said receiver including parametric oscillator means coupled to receive the interrogator signal and operable to generate two reference signals in quadrature phase with respect to each other and having a frequency equal to ½ the carrier frequency, the reference signals from the parametric oscillator means being in quadrature with each other, said receiver further including synchronous detector means for comparing the response signal with the reference signals and for generating an output signal in accordance with the relative phase relationship between the response signal and the two reference signals.

4. An interrogator responder signalling system comprising an interrogator station and a responder device movable into spaced relation with the interrogator station, said interrogator station including an oscillator for generating a carrier frequency of an interrogator signal, amplifying means coupled to the oscillator, two inductive loops both coupled to the amplifying means for receiving and transmitting the interrogator signal, said inductive loops being positioned adjacent to each other and being reversed in polarity with respect to each other whereby magnetic fields are generated in adjacent areas and having opposite polarity, said responder device including a parametric oscillator circuit for receiving the interrogator signal and for generating a response signal, the response signal generated by the parametric oscillator circuit having a frequency equal to ½ the carrier frequency and having a phase related to the carrier signal and determined by the polarity of the magnetic field, said interrogator station including a receiver and a receiver loop coupled thereto, the receiver loop encircling both the transmitter loops and the magnetic fields generated thereby, said receiver including two parametric oscillator circuits, both parametric oscillator circuits being coupled to the carrier oscillator in opposite polarity with respect to each other, said parametric oscillators being operable to generate reference signals having a frequency equal to ½ the carrier frequency and having a quadrature phase relationship with respect to each other, said receiver further including two synchronous detector circuits both coupled to receive the response signal from the receiver loop and each being coupled to receive a respective one of the reference signals, said synchronous detector means being operable to compare the response signal with each of the respective reference signals and to generate an output signal indicative of the respective transmitter loop and magnetic field into which the responder device has moved whereby the relative direction of travel of the responder device may be determined.

No references cited.

CHESTER L. JUSTUS, *Primary Examiner.*